Figure 20:
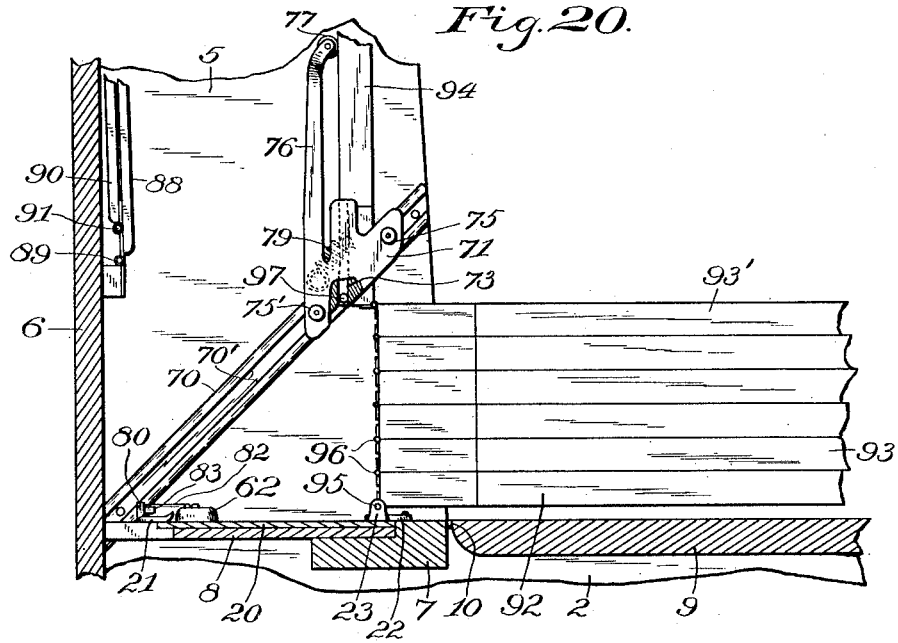

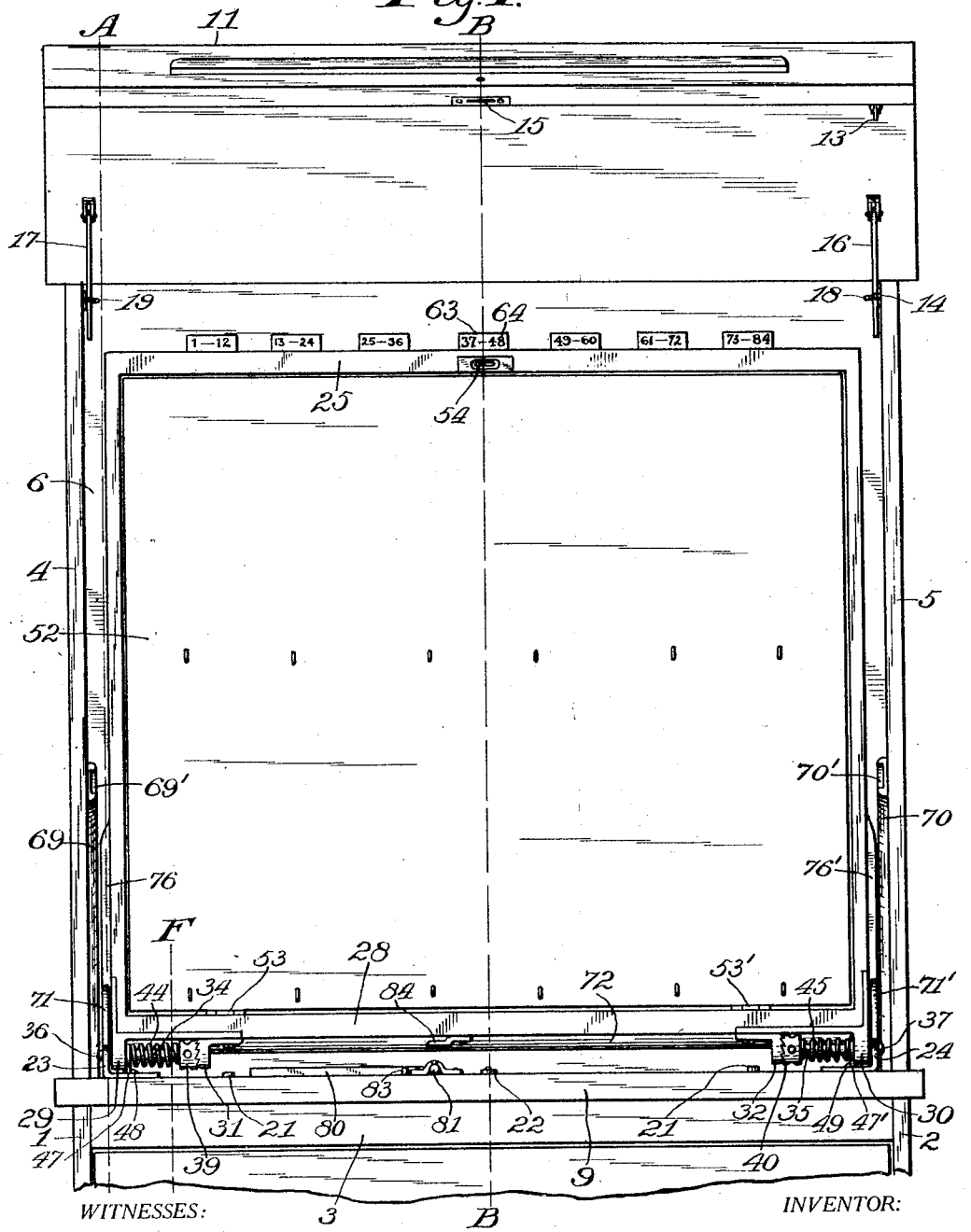

E. T. SILVIUS.
FILING APPLIANCE.
APPLICATION FILED MAY 4, 1909.
1,113,698.
Patented Oct. 13, 1914.
6 SHEETS—SHEET 2.
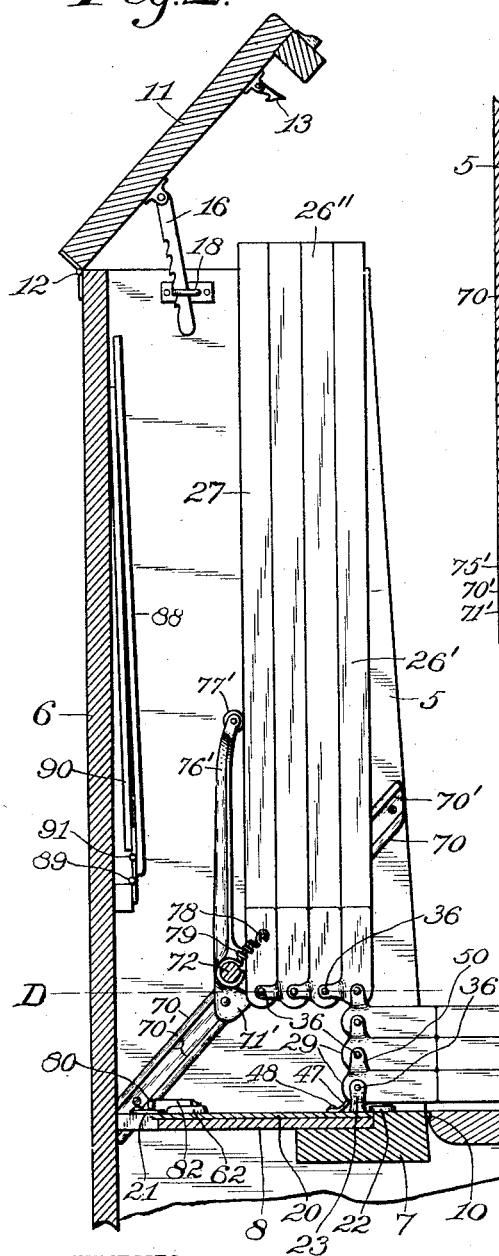
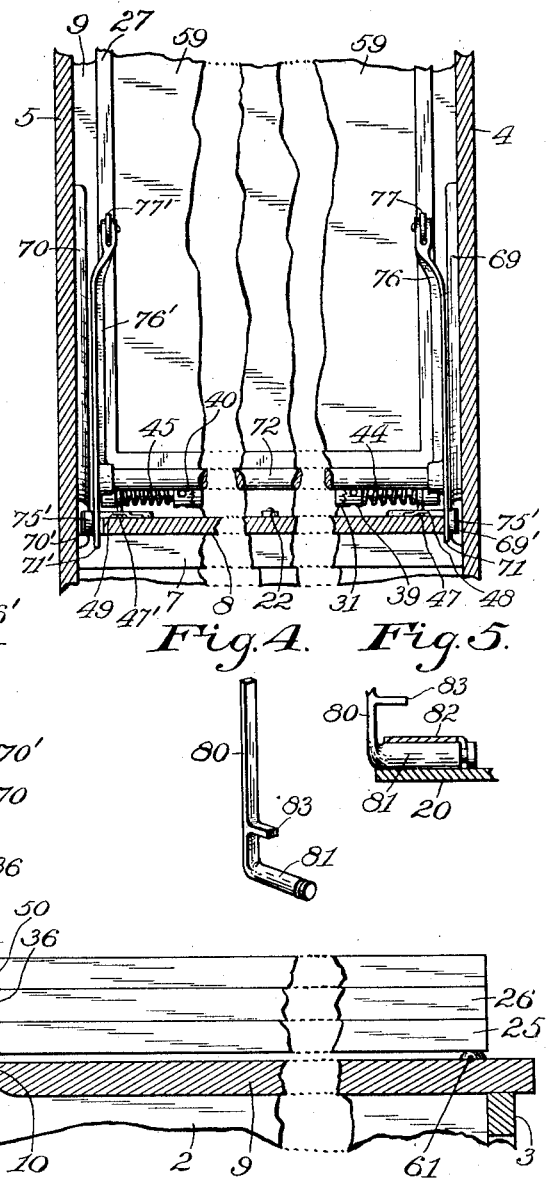
WITNESSES:
J. H. Gardner
K. R. Woddell
INVENTOR:
Ellis T. Silvius E. T. SILVIUS.
FILING APPLIANCE.
APPLICATION FILED MAY 4, 1909.
1,113,698.
Patented Oct. 13, 1914.
6 SHEETS—SHEET 3.
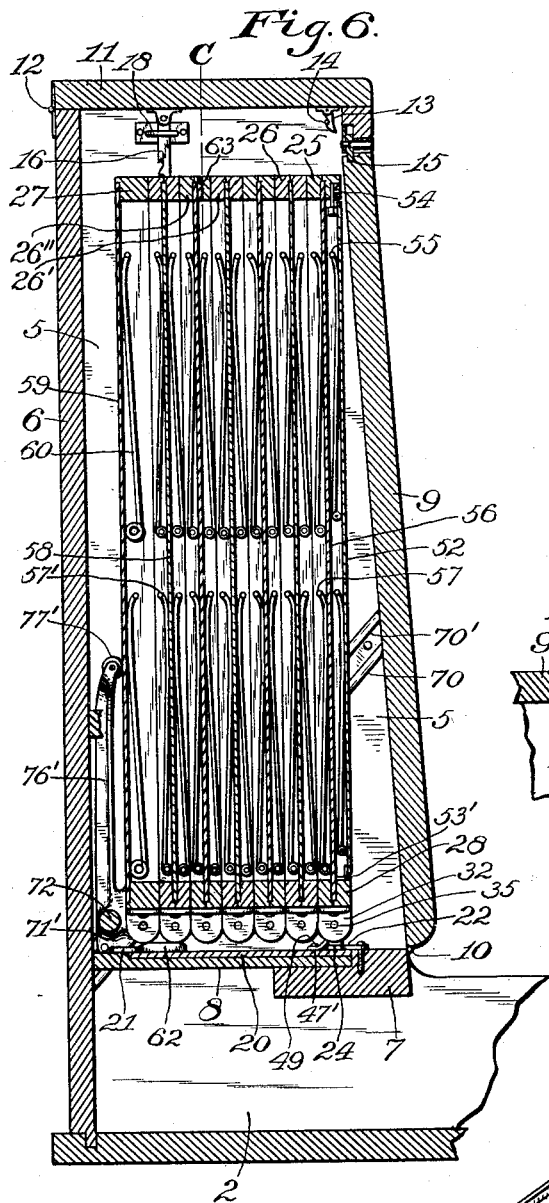
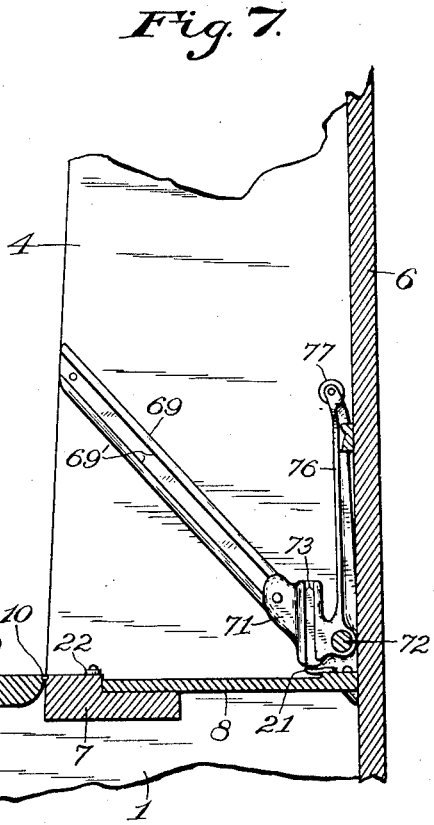
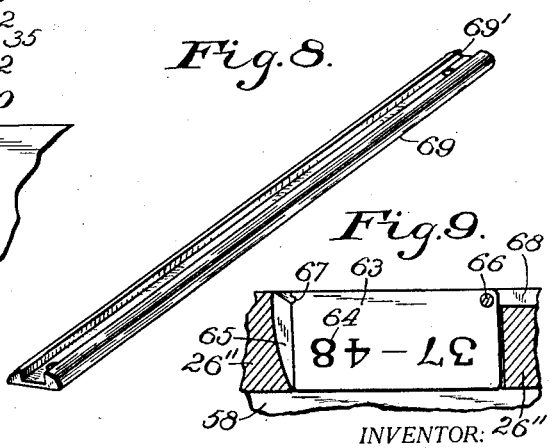
WITNESSES:
J. H. Gardner
K. R. Woddell
INVENTOR:
Ellis T. Silvius E. T. SILVIUS.
FILING APPLIANCE.
APPLICATION FILED MAY 4, 1909.
1,113,698.
Patented Oct. 13, 1914.
6 SHEETS—SHEET 4.
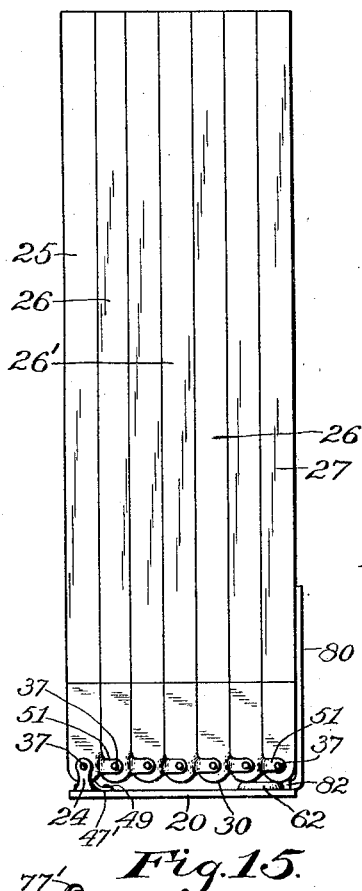
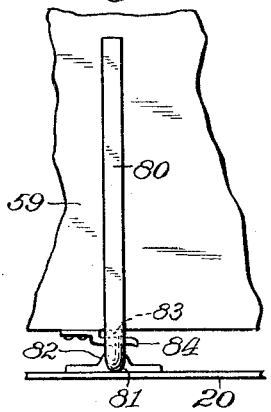
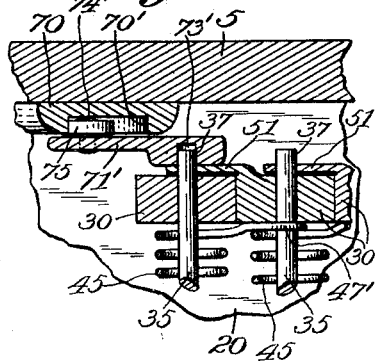
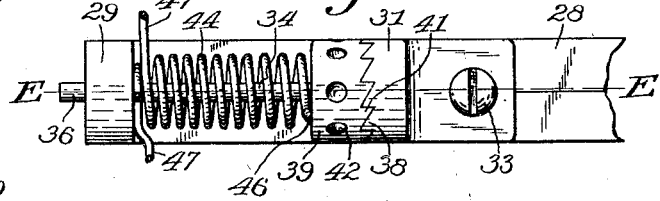
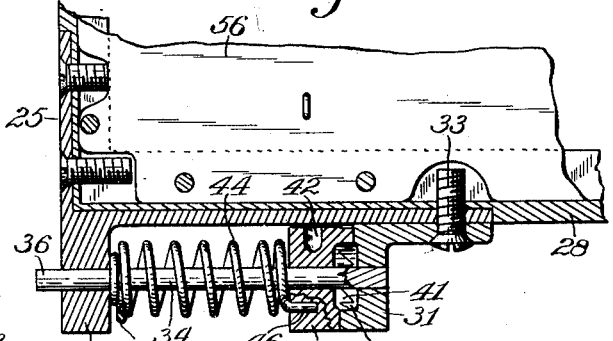
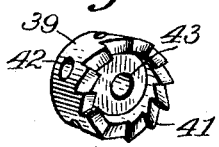
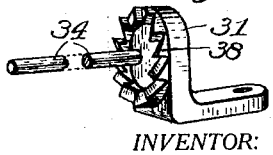
WITNESSES:
J. H. Gardner
K. R. Woddell
INVENTOR:
Ellis T. Silvius E. T. SILVIUS.
FILING APPLIANCE.
APPLICATION FILED MAY 4, 1909.
1,113,698.
Patented Oct. 13, 1914.
6 SHEETS—SHEET 5.
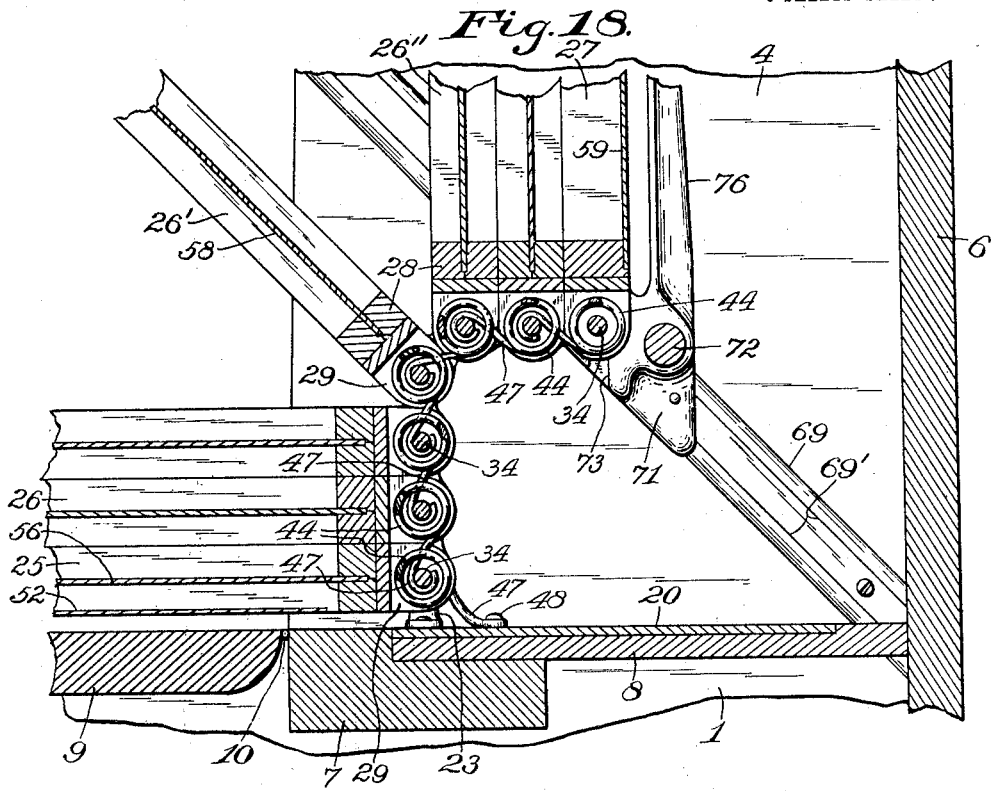
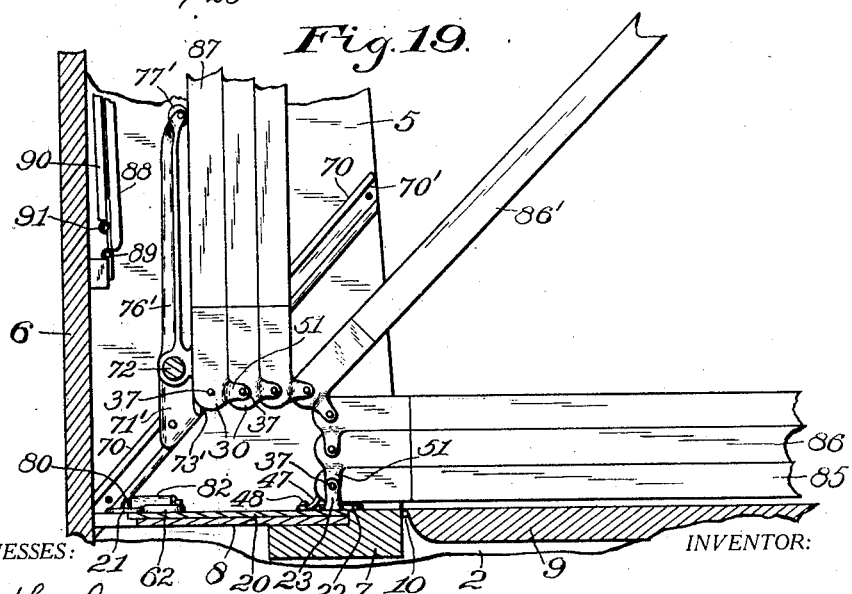
WITNESSES:
J. H. Gardner
H. R. Woddell
INVENTOR:
Ellis T. Silvius

E. T. SILVIUS.
FILING APPLIANCE.
APPLICATION FILED MAY 4, 1909.

1,113,698.

Patented Oct. 13, 1914.
6 SHEETS—SHEET 6.

WITNESSES:
J. H. Gardner
K. R. Woddell

INVENTOR:
Ellis T. Silvius

UNITED STATES PATENT OFFICE.

ELLIS T. SILVIUS, OF INDIANAPOLIS, INDIANA, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,113,698. Specification of Letters Patent. Patented Oct. 13, 1914.

Application filed May 4, 1909. Serial No. 493,922.

*To all whom it may concern:*

Be it known that I, ELLIS T. SILVIUS, a citizen of the United States, residing at Indianapolis, in the county of Marion and State of Indiana, have invented certain new and useful Improvements in Filing Appliances, and I do declare the following to be a full, clear, and exact description of the invention, reference being had to the accompanying drawings, and to the letters and figures of reference marked thereon, which form a part of this specification.

This invention relates to apparatus for filing papers of various kinds, and especially for systematically filing bill-slips or sales-bills in a convenient manner in accordance with the well known system of keeping credit accounts by means of duplicate sales bills in lieu of ledger accounts, the invention having reference to various features of construction of the case, comprising a part of the credit accounting register, and also to the bill holding leaves, the means for holding the leaves in their normal upright positions and for operating them.

An object of the invention is to provide means for normally supporting a group of bill holding leaves that are connected together so as to rotate and insure accurate perpendicularity of all the upright leaves remaining after one or more of the leaves have been drawn forward to prone positions, particularly with respect to leaves that are collated in a rectangular pack when in either upright or prone positions; a further object being to provide improved and simple means for at all times maintaining the leaves in accurate perpendicular positions so that when a number of the leaves are drawn down to prone positions the foremost one of the remaining upright leaves will be brought with precision to the position previously occupied by the foremost one of the upright leaves, in order that the attendant may the more readily find the proper locations for filing the bill-slips on the forward sides of the leaves, and particularly on the upper portions of the leaves.

A still further object is to provide improvements whereby index sheets may be inclosed in the case, so that they will not be open to public gaze while the register is in use.

Other objects will become apparent from the following description of the invention.

The improvement essentially comprises movable means connected with a plurality of bill holding leaves that are connected together so as to be rotatable, for constantly maintaining all the leaves precisely in substantially vertical planes that may remain in normal positions after one or more of the leaves are drawn forward to prone positions.

The invention comprises also a novel construction in bill holding leaves whereby a plurality of leaves that are carried by the foremost leaf are provided individually with balancing springs, so that the leaves will promptly rise from prone to their normal upright positions. And the invention consists further in the novel elements, and in the combinations and arrangements of parts, as hereinafter particularly described, and defined in the accompanying claims.

Referring to the drawings, Figure 1 is a front elevation of the improved filing appliance arranged in proper position for use, the lower portion of the case or cabinet being broken away; Fig. 2, a vertical sectional view of the cabinet with some of the leaves in normal positions and some in prone positions, as on the line A in Fig. 1 or near the inner side of the left hand side of the case and partially broken away, the leaves being shown in side elevation; Fig. 3, a fragmentary vertical sectional view as at the inner side of the back of the case looking forward; Figs. 4 and 5, details of devices for locking the leaves to their supporting base when removed from the case; Fig. 6, a fragmentary vertical sectional view on the line B B in Fig. 1 with all the leaves in their normal positions and inclosed by the case; Fig. 7, a fragmentary sectional view of the case on the line B B in Fig. 1 the leaves being removed; Fig. 8, a perspective view of one of the guides for the follower employed for maintaining the leaves in vertical arrangement; Fig. 9, a fragmentary sectional view as at the line C in Fig. 6 showing the construction and arrangement of the index plates of the leaves. Fig. 10, a side elevation of the leaves arranged in the rectangular pack for insertion into a fire proof safe or vault; Fig. 11, a fragmentary detail showing the devices for locking the leaves to their supporting base; Fig. 12, a fragmentary horizontal sectional view taken at the right hand side of the register, as on the plane of the line D in Fig. 2; Fig. 13, a plan view of the normal bottom of the leaf inverted; Fig. 14, a fragmentary sectional view of a leaf as on the line E E in Fig. 13; Fig. 15, a perspective view of the leaf follower constituting a support or stop for the upright leaves to limit rotative movements of the leaves rearward; Fig. 16, a perspective view of a ratchet wheel for adjusting the tension of the leaf springs; Fig. 17, a perspective view of the head block and a guide rod of the leaf springs with which the ratchet wheel coöperates; Fig. 18, a fragmentary vertical sectional view approximately on the line F in Fig. 1 with the leaves in various positions and illustrating the relative arrangement of the leaf springs; Fig. 19, a fragmentary sectional view approximately on the plane corresponding to the line A in Fig. 1 with the leaves modified in arrangement and shown in different positions, all the leaves being reversed in order; Fig. 20, a fragmentary sectional view also near the line A in Fig. 1 with the leaves in different positions and connected together by means of hinges; and Fig. 21 a fragmentary sectional view similar to the preceding figure and showing the hinged leaves having the follower connected thereto by modified means.

Similar reference characters throughout the various figures of the drawings indicate corresponding elements or features of construction.

The construction which I have chosen to illustrate as one embodiment of the improvement comprises a desk part having sides 1 and 2 and a front 3, the rear portion of the desk part having a case erected thereon having two sides 4 and 5, and a back 6 joined to the sides and extending down to form the back of the desk part, a rail 7 extending between the sides 1 and 2 at the lower forward portions of the sides 4 and 5, and a floor 8 extending from the rail rearward to the back 6. A door 9, preferably connected by hinges 10 to the forward side of the rail 7, normally lies on the sides 1 and 2 to form a top for the desk part. The door 9 may swing to an upright position against the fronts of the sides 4 and 5 to inclose the leaves when desired. The case is provided with a cover or lid 11 that is connected by hinges 12 to the back 6, the under side of the cover being provided with a suitable catch 13 adapted to engage a projection 14 on the inner side of the side 5 of the case to hold the cover in closed position. A suitable lock 15 may be provided for locking the door 9 to the cover 11, so as to prevent access to the accounts or bill slips on the leaves. The top is provided with a pair of suitable props 16 and 17 that are adapted to engage supporting devices 18 and 19 for holding up the cover when the appliance or register is in use as in Fig. 2. The case, however, may be otherwise constructed if desired.

A base 20 for the bill holding leaves is mounted removably on the floor 8 and has its rear side inserted under fingers 21 which are secured to the floor, the forward part of the base being held firmly on the floor by a suitable button or catch 22 that will permit of the base being removed from the floor when desired. A pair of pivoting stands 23 and 24 are secured on the top of the forward portion of the base for supporting all the bill holding leaves.

The leaves may be variously constructed in detail and they comprise a forward frame 25, intermediate frames as 26, 26', 26'', and a rear frame 27, each frame having a hinge-bar 28 which is the bottom portion of the frame when in its normal upright position, and the ends of the hinge-bar are provided with projecting ears 29 and 30 which have suitable pivots or hinge rods thereon for connecting the frames one to another as a group. Each hinge-bar 28 has a pair of head blocks 31 and 32 mounted thereon opposite to the ears and secured removably preferably by means of screws 33. The head blocks have guide rods 34 and 35 connected thereto that extend through the ears 29 and 30, so that their outer ends constitute pivots or hinge-rods 36 and 37 for the frame. The hinge-rod is fitted closely in the head block and in the ear and is rigid in either the ear or the head-block, preferably in the latter. The head-blocks are provided with ratchet teeth 38 that extend toward the ears. Two ratchet-wheels 39 and 40 are provided for each leaf frame, and they have each a suitable number of ratchet teeth 41 adapted to engage the teeth 38, the wheels having sockets 42 in their peripheries for turning them, and axle bearings 43 to receive the guide rods on which they are rotatively mounted. Each leaf frame is provided with two balancing-springs 44 and 45, one on each of the two guide rods, and each coiled about its guide-rod, and having arms 46, one each entering or engaging a ratchet-wheel, and the opposite end of the springs having arms 47 and 47', one arm on each spring. The arms 47 and 47' of the springs of the forward frame engage clips 48 and 49 that are secured to the base 20, and the similar arms of the springs of all the other leaf frames rearward of the forward frame engage the upper side of the hinge-rods of the next adjacent forward frame, as and for the purposes hereinafter explained. Each leaf frame hereinbefore mentioned has two pivots 36 and 37 and the pivots of the foremost frame 25 are mounted in the pivoting stands 23 and 24, and the arms 47 and 47' being anchored enable the springs to exert their energy toward holding the leaf frame upward or toward the rear of the case, and, of course, may be adjusted, so as to lift the leaf from the prone position. Each leaf-frame, except the rearmost one, is provided with a pair of arms 50 and 51 that extend transversely to the plane of the frame, being rearward when the frame is upright, and the arms may extend at any suitable angle, preferably at right angles to the plane of the frame.

The pivots of the frame 26 are mounted in the arms of the frame 25 and similarly the pivots of each succeeding frame are mounted in the arms of the adjacent forward frame, so that the foremost frame is pivotally supported and supports all the other frames collectively, each one of the frames exerting a gravity force at the ends of the arms of the next forward frame which acts to move the upper ends of the frames rearward when the frames are somewhat near to vertical positions. The springs that are mounted on the frame 26 act to hold that frame upright, and when moving upright does not disturb the action of the frame 25. The springs on the frame next above or behind the frame 26 tend likewise to raise the leaf, and the arms 47 and 47' of the springs being in engagement with the guide rods of the frame 26 have little influence toward disturbing the action of the frame 26, but tend in a slight degree to raise the frame 26, so that as will be seen while the springs tend to raise the leaf frames they do not exert their force toward holding down the prone leaves. In some cases it may be desirable and is permissible to dispense with the balancing springs on all the intermediate leaves and the foremost leaf, but it is preferable to employ the springs on the foremost leaf since it is clear that the leaves when upright will so remain by the force of gravity if prevented from falling rearward, but the springs are usually desirable for causing the leaves to move up to their normal positions quickly.

As above-mentioned the leaves may be variously constructed in detail and preferably the foremost leaf comprises a shutter 52 arranged at the forward side of the frame 25 and connected to the hinge-bar 28 of the frame by hinges 53 and 53', a suitable latch 54 being provided for detachably fastening the free end of the shutter to the free end of the leaf frame, the inner side of the shutter being provided with a suitable number of bill clamps 55 for holding memorandum slips or papers other than the regular bill slips. The frame 25 has also a plate 56 attached thereto completing the leaf proper and to which a suitable number of bill clamps 57 are mounted on the rear side thereof for holding sales-bills, the plate 56 being preferably midway between the front and rear sides of the frame. The intermediate frames each comprise a plate as 58 attached thereto midway between the forward and rear sides thereof, and the rearmost frame 27 has a plate 59 attached to the rear side thereof, the plates of the intermediate leaves having bill clamps 57' thereon, and the plate of the rearmost leaf having bill clamps 60 on the inner side thereof. Preferably the inner or upper side of the door 9 has a cushion 61 to be engaged by the forward leaf frame 25 when in prone position, and the base 20 has a cushion 62 thereon to be engaged by the rearmost frame when the leaves are in normal upright positions, the cushions serving to prevent noise in action. It will be understood that when the leaves are in upright positions they may be in exact perpendicular planes or may all lean slightly rearward at an angle if desired, and obviously when in prone position they may be either exactly horizontal or may be slightly inclined with their forward or free ends slightly lower than their pivoted ends, as may be desired.

The upper or free end of each leaf is provided with a disappearing index plate 63 having index characters 64 thereon. The plate is adapted to fit into a recess 65 in the frame and supported at one corner by a pivot 66, while an opposite corner is formed with a notch 67 therein for withdrawing a plate from its recess and turning it over in the groove 68 formed in the top edge of the frame, so that when the register is in use the index plates will be exposed above the top of the leaf frame. The index plates are arranged in different positions on the different frames relatively, so that all of the index plates will be in view.

In order to prevent the upright leaves from swinging rearward beyond the desired normal position, the rearmost leaf is provided with a suitable device for limiting the pivotal movement of the leaf rearward, the device being movable with the rearmost leaf and detachable therefrom. The device and its connections preferably comprise two guide bars 69 and 70 that are attached to the inner sides of the sides 4 and 5 of the case and extend approximately from the back 6 upward toward the forward edges of the sides of the case, the guide bars having guide grooves 69' and 70' therein respectively. A follower comprises a carriage having two sides 71 and 71' and a cross-bar 72 connected to the two sides, the sides having vertical guide grooves 73 and 73' in the inner sides thereof respectively. The carriage is provided with axles 74 and 74' on which are wheels or rollers 75 and 75' running in the guide grooves 69' and 70', and the sides have arms 76 and 76' thereon that extend upward and are provided at their upper ends with rollers 77 and 77' that engage the rear side of the rearmost leaf. The pivots of the rearmost leaf extend into the guide grooves 73 and 73', so that vertical movement may occur as between the rearmost leaf and the carriage of the follower during irregular or variable movements of the rearmost leaf as it describes arcs of circles either about the axis of the pivots of the foremost leaf or the pivots of either of the other leaves, and therefore as the rearmost leaf moves upward and forward or in reverse directions it is constantly in the same vertical angle by reason of being in engagement with the rollers on the arms of the follower. Of course, if desired the rollers can be dispensed with, so that direct contact would be made by the rear leaf against the arms. The follower as will be seen is moved by means of the rearmost leaf, but its path is controlled by the guide-bars on the case. When it is desired to omit the balancing springs above described or in case an auxiliary spring is desired the rearmost leaf frame 27 has a projection 78 thereon to which is hooked a spring 79 that is connected to the cross-bar 72 of the follower and so strained that the spring will exert its force to draw the rear leaf to an upright position and hold it against the arms of the follower, the spring permitting the leaf to be drawn down to prone position.

In order to secure the group of leaves to the base 20 when all are removed from the case for convenient handling, a locking bar 80 is provided that has a journal 81 extending laterally on one end thereof which is mounted rotatively in the journal-box 82 that is mounted on the base 20. The locking-bar has a finger 83 thereon which is adapted to engage a latch plate 84 secured on the under side of the hinge-bar 28 of the rearmost leaf frame. The locking bar 80 normally lies on the base 20 when not in use, (see Fig. 1) and when swung upward pivotally it engages the rear side of the rearmost leaf to prevent rearward movement of the leaf relatively to the base, while the finger 83 prevents the base from moving relatively to the leaves about the pivots of the foremost leaf, so that when removed from the case the series of leaves will stand upright as a rectangular pack, as in Fig. 10 in which condition the pack may be readily handled and inserted into a receptacle for safe keeping.

It shoud be understood that the series of leaves connected together in the group as described may in some cases be arranged in the case in reverse order, so that the leaves would appear as in Fig. 19, and the frame heretofore indicated by 27 appearing as the foremost frame 85, and intermediate frames, as 86, 86', and the frame indicated as 25 appearing as the rearmost frame 87 in which case the pivots of the frame 85 are mounted in the pivoting stands with which the base 20 is provided and all the frames except the foremost frame has the arms thereon that are pivotally connected with the next adjacent forward frames, and the pivots of the rearmost frame being connected with the follower. In this modification it is desirable that the foremost leaf be provided with the balancing springs while the springs may be omitted from the remaining leaves, if desired, the rearmost leaf 87 being in contact with the follower and thereby maintained in the desired vertical angle in all its positions forward or rearward of any vertical plane it may occupy.

When desired a plate 88 is connected by hinges 89 to the inner side of the back 6 and has another plate 90 connected thereto by hinges 91, the plates normally leaning against the back 6, and are convenient on which to place index sheets or delinquent sheets commonly used in the system.

Figure 21:
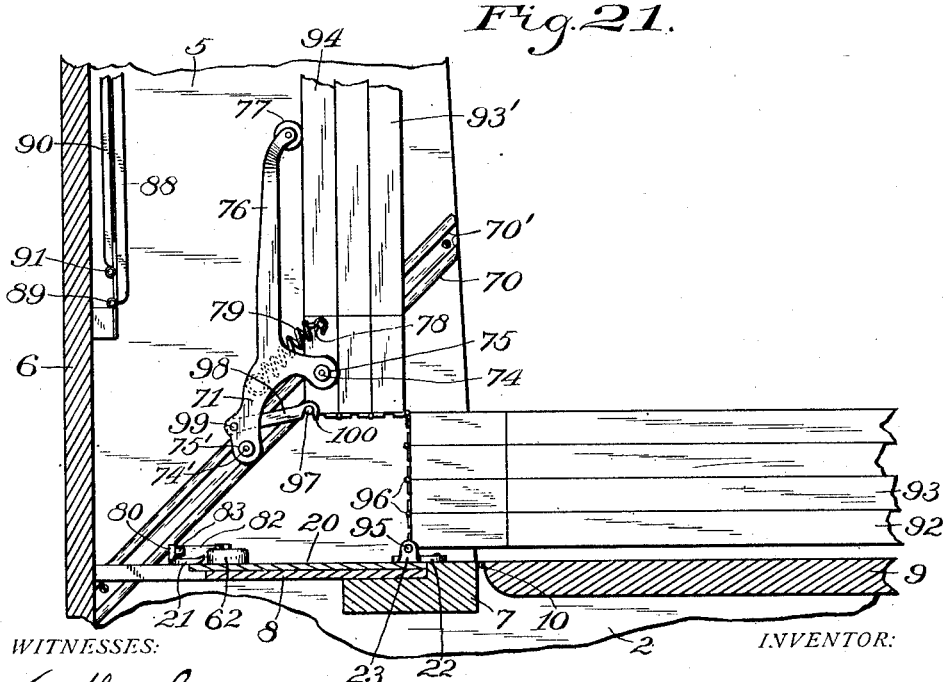

When it is preferred to employ gravity leaves or those devoid of balancing springs a series of leaves as 92, 93, 93', 94 may be used and when upright they are constantly maintained at the desired vertical angle at all times by substantially the same follower hereinbefore described, the foremost leaf 92 having its pivots 95 mounted in the pivoting stands as 23 with which the base 20 is provided and the leaves connected together by means of butts or hinges 96 in a well known manner, the rearmost leaf 94 having pivotal projections 97 extending into the vertical guide grooves as 73 in the sides of the carriage of the follower and the rearmost leaf being maintained in the desired angle by the arms of the follower, the leaves so arranged requiring no balancing springs as illustrated in Fig. 20, but in some cases, as in Figs. 20 and 21 the rearmost leaf may be provided with a projection 78 and a spring 79 hereinbefore described for inducing quick action of the leaves in rising to upright positions.

Another modification is shown in Fig. 21 in which a coupling bar 98 is connected by a pivot 99 to the side 71 of the follower carriage and has a hook 100 detachably connected to the pivotal projection 97, for connecting the follower to the rearmost leaf and permitting relatively vertical movements as between the leaf and the follower, in lieu of the preferred practice of extending the pivotal projections 97 into the guide-grooves of the follower carriage hereinbefore described.

It will be apparent that the case as an inclosure for the leaves may be dispensed with if desired, so that the case sides need be only sufficiently high to support the inclined guide-bars 69 and 70, the back of the case and the cover of course being omitted in construction, and thus apparatus may be considerably cheapened to supply the needs of the smaller user.

In practical use the apparatus may be operated essentially as must result from the construction hereinbefore described, and it will be observed that the series of bill holding leaves and their supporting base may be readily inserted into the case of the register or cabinet or removed therefrom, and it will be apparent that when the leaves and base are removed from the case they will occupy but little more space than that required for the leaves alone. The index sheets will be so arranged that they can not be scrutinized by the over-curious, and memorandum charge slips or partially filled orders may be conveniently filed temporarily on the inner side of the shutter 52. Miscellaneous bills or accounts of casual credit customers may be kept on the rearmost leaf while the accounts of the regular customers will be kept on the other leaves. In small stores or where the register is not used constantly the door 9 may be closed and locked to prevent tampering with accounts during temporary absence of the proprietor. After the door is unlocked and drawn down to prone position the cover 11 may then be unlatched and raised so that the leaves may be operated. During the movement of all the leaves together from upright to prone positions the pivots of the rearmost leaf as also those of the other leaves would follow concentric circles about the pivots of the foremost leaf and the follower would be drawn along with the rearmost leaf. If one or more of the foremost leaves are drawn forward the pivotal axis of the rearmost leaf will follow a curve that is eccentric to the axis of the pivots of the foremost leaf, and then if all the remaining leaves be drawn forward the pivots of the rearmost leaf will follow another curve that is eccentric to the axis of the pivots of the foremost leaf and arrive at the position that it should occupy when all the leaves are prone, so that the motions may be various, depending on the number of leaves that may be drawn forward at a time, and in all cases the pivots of the rearmost leaf will move vertically with respect to the follower at different points of movement of the leaves forward or backward, but inasmuch as the vertical movements as between the rearmost leaf and the follower are with sliding or flexible connections vertically, the vertical angles of the leaves remain the same at all times, which is a convenience to the merchant or attendant in that he may become accustomed to reach to a certain vertical plane at all times to have access either to the foremost leaf or to either one of the other leaves when drawn forward after those preceding have been drawn to prone positions. Other results and advantages of operation will from the foregoing description be understood.

Having thus described the invention, what I claim as new, is—

1. The combination of a series of leaves, means for connecting the leaves together and permitting their pivotal movement from a vertical to a horizontal position and vice versa, and guiding and carrying means for the rear leaf engaging therewith at or near its lower end for maintaining the rear leaf upright, the said means permitting bodily movement of the leaf vertically with respect to said carrying means as the leaves forward thereof are operated.

2. In a filing appliance, the combination of a series of leaves, means for connecting the leaves together and permitting pivotal movements from a vertical to a horizontal position and vice versa, and means for maintaining the rear leaf upright when one or more of the other leaves are operated, said means comprising an inclined guide, and a guide device provided with means for permitting the bodily movement of the leaf vertically during its forward movement.

3. In a filing appliance, the combination of a series of leaves, means for connecting the leaves together and permitting pivotal movements from a vertical to a horizontal position and vice versa, and means for maintaining the rear leaf upright when one or more of the other leaves are operated, said means comprising a forwardly movable guide device provided with means permitting the bodily movement of the said rear leaf in a vertical direction during its forward movement.

4. In a filing appliance, the combination of a series of leaves having connections between them and operating when one or more of the leaves are reclined to move the lower edges of the remaining upright leaves forwardly, and paralleling means including a carriage movable with the rear leaf of the series for maintaining it and the remaining upright leaves in upright position and moving them bodily forward when one or more of the said leaves are operated, and connections between the carriage and the rear leaf permitting movement of said leaf relative to the carriage as any of the remaining leaves are operated.

5. A series of normally upright rectangularly-packed rotatable leaves with gearing connections between them, and guiding and carrying means connected with and operated by the rearmost leaf, whereby a forward rotation of one leaf to a prone position moves the upright leaves forward bodily to bring the foremost one thereof precisely into the normal upright plane of the rotated leaf, the said guiding and carrying means including connections between them and the rearmost leaf which permit movement of said leaf relative to the said means as any of the remaining leaves are operated.

6. In a filing appliance, the combination of a series of leaves having pivotally connecting devices between them, and guide means engaging and movable with the rear leaf of the series upwardly and forwardly and permitting a simultaneous vertical movement of the said rear leaf and operating to maintain it in upright position during the operation of the remaining leaves of the series.

7. In a filing appliance, the combination of a series of leaves having pivotally connecting devices between them, and guide means engaging and movable with the rear leaf of the series and including a yielding device for maintaining the said leaf in upright position during the operation of the remaining leaves of the series.

8. A series of normally upright rotatable leaves of which the foremost one thereof is mounted on fixed pivotal supports to move the remaining leaves to or fro with connections between the leaves, the rearmost one of the leaves having back supporting means connected therewith and movable thereby for maintaining the leaves when upright at a predetermined angle during to and for movements thereof, and connections between the back supporting means and the rearmost leaf permitting movement thereof relative to said means as any of the remaining leaves are operated.

9. A series of leaves rotatably supported normally at an approximately vertical predetermined angle and the forward leaves acting, when rotatively moved forward, to draw the supports of all the other leaves of the series upward and forward to different positions, sliding means connected with and operated by the rearmost one of the leaves for maintaining the predetermined angularity of the approximately vertical leaves, the said sliding means including connections with the rearmost leaf which permit movement thereof relative to said means as any of the remaining leaves are operated.

10. In a filing appliance, the combination of a series of leaves having connections between them for permitting pivotal movements from a vertical to a horizontal position and vice versa, and operating, when one or more of the leaves are reclined, to move the remaining leaves forwardly, and slidable means moving upwardly and forwardly with and operated by the rear leaf of the series for maintaining the remaining upright leaves in vertical position and permitting relative movement of the said rear leaf therewith as any of the remaining leaves are operated.

11. A series of leaves rotatably supported normally at an approximately predetermined angle, and the forward leaves acting, when rotatably moved forward, to draw the supports of all the other leaves of the series upward and forward to different positions, and slidably mounted means connected with the lower portion of the rear leaf and operated thereby, arranged to move upwardly and forwardly with said leaf for maintaining the predetermined angularity of the approximately vertical leaves, the connections between said slidably mounted means and the rear leaf permitting movement of the rear leaf relative to said means as any of the remaining leaves are operated.

12. A plurality of leaves connected one to another to move rotatively, the foremost one of the leaves being pivotally supported and the forward leaves when moving rotatively acting to move the rearward leaves bodily, all the leaves normally standing upright, a back support for the rearmost one of the leaves movable therewith when moving bodily, and a spring mounted on the rearmost one of the leaves and having an arm coöperating with the next adjacent one of the leaves to normally hold the rearmost leaf to the support.

13. A filing appliance including a base, pivotal supports on the base, a plurality of leaves each with a pair of arms thereon pivotally connected with an adjacent one of the leaves, the foremost one of the leaves being pivotally supported in the pivotal supports, all the leaves normally standing upright and being movable upwardly and forwardly pivotally to prone positions, all but the foremost one of the leaves being also movable bodily to or fro, and means connected with and moved by the rearmost one of the leaves, the said means including devices for permitting vertical movement of the said rearmost leaf, whereby the said leaves when moved to and fro in upright positions are maintained precisely at a predetermined angle.

14. A plurality of leaves connected one to another to move rotatively, the foremost one of the leaves being pivotally supported and the forward leaves when moving rotatively acting to move the rearward leaves bodily, all the leaves normally standing upright, a back support for the rearmost one of the leaves and movable therewith when moving bodily, a spring connected with the movable support and also with the rearmost one of the leaves yieldingly coupling them together, and a guide for maintaining the movable support at a predetermined angle.

15. A series of normally upright rotatable leaves of which the foremost one thereof is mounted on fixed pivotal supports to move the remaining leaves to or fro with connections between the leaves, the leaves when moving to or fro moving also upward or downward, a device at the rear of the rearmost one of the leaves in engagement therewith, a guide supporting the device movably and maintaining it in a predetermined angle, and means connecting the device to the rearmost leaf to be moved thereby and permitting the leaf to move upward or downward relatively to the device, for maintaining the upright leaves at the predetermined angle.

16. A base, pivotal supports on the base, a plurality of bill-holding leaves pivotally connected together, one of the leaves being pivotally mounted in the supports and supporting the intermediate and terminal leaves in approximately upright positions at a predetermined angle, the pivotally mounted one and the intermediate leaves when moved pivotally coöperating to move the remaining upright leaves bodily to or fro, means for normally moving the upright leaves pivotally in one direction, and movable means for precisely limiting the movement of the upright leaves pivotally in the one direction during their movements bodily to and fro and maintaining the predetermined angularity of the leaves throughout the range of their movements bodily, the said movable means including connections between them and the rear leaf permitting movement of the leaf relative to said means as any of the remaining leaves are operated.

17. An account register including a base, pivotal supports on the base, a plurality of grouped upright leaves each having arms thereon pivotally connected with an adjacent leaf, the foremost one of the leaves being pivotally supported in the pivotal supports and supporting the remaining leaves, the forward leaves when moved pivotally acting to move the remaining leaves bodily, a device mounted movably at the rear of the rearmost one of the leaves and coupled thereto to be moved thereby, a guide for maintaining the device during movement thereof at a predetermined angle, and a spring suitably mounted for maintaining the leaves at the angle of the device when upright and when moving bodily.

18. The combination of a series of leaves having connections between them operating when one or more of the leaves are reclined to move the remaining leaves forwardly, supporting devices for the rear leaf of the series, a yielding device connecting the rear leaf and supporting devices together, and means for slidably mounting the said supporting devices.

19. In a filing appliance, the combination of a series of leaves having connections between them operating, when one or more of the leaves are reclined, to move the remaining leaves forwardly, a sliding carriage for supporting and guiding the rear leaf during its forward movement, and connections between the carriage and the rear leaf permitting the vertical sliding of the rearmost leaf relative to said carriage during its forward movement.

20. In a filing appliance, the combination of a series of leaves having connections between them operating, when one or more of the leaves are reclined, to move the remaining leaves forwardly, a support and guide for the rearmost leaf, means carried by the said support and guide arranged to engage with the said leaf between its upper and lower edges for maintaining the leaf upright during its forward movement, and means permitting the vertical sliding movement of the said leaf during its forward movement.

21. In a filing appliance, the combination of a series of leaves having connections between them operating, when one or more of the leaves are reclined, to move the remaining leaves forwardly, a support and guide for the rearmost leaf, means carried by the said support and guide arranged to engage with the said leaf between its upper and lower edges for maintaining the leaf upright during its forward movement, and a yielding connection between the said rear leaf and the leaf engaging means.

22. An account-register having, in combination, a series of bill-holder frames pivotally connected at the bottom, a pivotal support for the foremost frame, and means for maintaining the rearmost frame in upright position, said means being movable forwardly and rearwardly as the frames are swung downwardly and upwardly and having sliding connections to permit the rearmost frame to rise and fall.

In testimony whereof, I affix my signature in presence of two witnesses.

ELLIS T. SILVIUS.

Witnesses:
P. A. HAVELICK,
J. H. GARDNER.